United States Patent
Rao (10) Patent No.: US 11,727,381 B2
(45) Date of Patent: Aug. 15, 2023

(54) METHOD, SERVER, AND READABLE STORAGE MEDIUM FOR PROCESSING PAYMENT IN OFFLINE SCENARIO

(71) Applicant: Advanced New Technologies Co., Ltd., Grand Cayman (KY)

(72) Inventor: Kaili Rao, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 17/842,655

(22) Filed: Jun. 16, 2022

(65) Prior Publication Data

US 2022/0318776 A1 Oct. 6, 2022

Related U.S. Application Data

(60) Division of application No. 17/166,767, filed on Feb. 3, 2021, now Pat. No. 11,410,150, which is a
(Continued)

(30) Foreign Application Priority Data

Nov. 19, 2018 (CN) .......................... 201811373661.3

(51) Int. Cl.
*G06Q 20/20* (2012.01)
*G06Q 20/02* (2012.01)
(Continued)

(52) U.S. Cl.
CPC ........... *G06Q 20/204* (2013.01); *G06Q 20/02* (2013.01); *G06Q 20/202* (2013.01);
(Continued)

(58) Field of Classification Search
CPC .... G06Q 20/204; G06Q 20/02; G06Q 20/202; G06Q 20/3274; G06Q 20/405;
(Continued)

(56) References Cited

U.S. PATENT DOCUMENTS

2012/0232968 A1* 9/2012 Caiman ................ G06Q 20/322
705/14.4
2012/0330845 A1* 12/2012 Kang .................. G06Q 20/3274
235/494
(Continued)

FOREIGN PATENT DOCUMENTS

CN 106296186 A 1/2017
CN 106339868 A 1/2017
(Continued)

*Primary Examiner* — A. Hunter Wilder
*Assistant Examiner* — Joseph M Mutschler
(74) *Attorney, Agent, or Firm* — Seed IP Law Group LLP (57) ABSTRACT

An implementation of the present specification discloses a method for processing payment in an offline scenario. A collection terminal, when in an offline state, scans an offline code generated by a user terminal in an offline state to obtain offline code information, obtains a payment amount, and saves the offline code information and the payment amount, and if in an online state, uploads the offline code information and the payment amount to a server, so that after receiving the offline code and the payment amount, the server pays a deduction amount from a corresponding payment account based on the offline code information and the payment amount, and thus puts the deduction amount into a payment account corresponding to the collection terminal. As such, the payment function can still be achieved when the user terminal and the collection terminal are in an offline state.

14 Claims, 3 Drawing Sheets

Related U.S. Application Data continuation of application No. PCT/CN2019/106949, filed on Sep. 20, 2019.

(51) Int. Cl.
*G06Q 20/32* (2012.01)
*G06Q 20/40* (2012.01)
*G06K 7/10* (2006.01)
*G06K 7/14* (2006.01)
*G06K 19/06* (2006.01)
*G06Q 20/24* (2012.01)

(52) U.S. Cl.
CPC ....... *G06Q 20/3274* (2013.01); *G06Q 20/405* (2013.01); *G06K 7/1095* (2013.01); *G06K 7/1417* (2013.01); *G06K 19/06037* (2013.01); *G06K 19/06112* (2013.01); *G06Q 20/24* (2013.01); *G06Q 20/326* (2020.05)

(58) Field of Classification Search
CPC .... G06Q 20/326; G06Q 20/24; G06K 7/1095; G06K 7/1417; G06K 19/06037; G06K 19/06112
See application file for complete search history.

(56) References Cited

U.S. PATENT DOCUMENTS

| | | |
|---|---|---|
| 2016/0110968 A1 | 4/2016 | Tatara |
| 2016/0275472 A1 | 9/2016 | Rajamannar |
| 2019/0279326 A1 | 9/2019 | Chen et al. |

FOREIGN PATENT DOCUMENTS

| | | | |
|---|---|---|---|
| CN | 106651350 A | | 5/2017 |
| CN | 106875179 A | | 6/2017 |
| CN | 206684861 U | | 11/2017 |
| CN | 107665427 A | | 2/2018 |
| CN | 108053205 A | * | 5/2018 |
| CN | 108053205 A | | 5/2018 |
| CN | 108596629 A | | 9/2018 |
| CN | 110046881 A | | 7/2019 |
| EP | 2447919 A1 | | 5/2012 |
| TW | 201826189 A | | 7/2018 |
| WO | 2017185349 A1 | | 11/2017 |

* cited by examiner

METHOD, SERVER, AND READABLE STORAGE MEDIUM FOR PROCESSING PAYMENT IN OFFLINE SCENARIO

BACKGROUND

Technical Field

Implementations of the present specification relate to the field of data processing technologies, and in particular, to a method, a server, and a readable storage medium for processing payment in an offline scenario.

Description of the Related Art

With the rapid development of electronic payment, users can complete payment by simply carrying mobile devices without carrying cash, which brings great convenience to users.

Existing electronic payment usually requires both parties or the payee to be online, and the payment cannot be completed when both parties are offline. For example, when a smartphone carried by a user is offline and a corresponding collection device of the payee is online, the payment can be completed by using the collection device to scan an offline code on the smartphone; but the payment cannot be completed when both the smartphone and the collection device are offline.

BRIEF SUMMARY

According to a first aspect, an implementation of the present specification provides a method for processing payment in an offline scenario, which is applied to a collection terminal and includes: scanning, when the collection terminal is in an offline state, an offline code generated by a user terminal in an offline state to obtain offline code information; obtaining a payment amount; saving the offline code information and the payment amount; and after the offline code information and the payment amount are saved, if the collection terminal is in an online state, uploading the offline code information and the payment amount to a server, and obtaining a deduction amount paid by the server based on the offline code information and the payment amount.

According to a second aspect, an implementation of the present specification provides a method for processing payment in an offline scenario, which is applied to a server and includes: receiving offline code information and a payment amount sent from a collection terminal, the offline code information being obtained by scanning, when the collection terminal is in an offline state, an offline code generated by a user terminal in an offline state; and paying a deduction amount from a corresponding payment account based on the offline code information and the payment amount, and putting the deduction amount into a payment account corresponding to the collection terminal.

According to a third aspect, an implementation of the present specification further provides a collection terminal, including: an offline code generation unit, configured to scan, when the collection terminal is in an offline state, an offline code generated by a user terminal in an offline state to obtain offline code information; a payment amount acquisition unit, configured to obtain a payment amount; an information storage unit, configured to save the offline code information and the payment amount; an information uploading unit, configured to: after the offline code information and the payment amount are saved, if the collection terminal is in an online state, upload the offline code information and the payment amount to a server; and a deduction amount acquisition unit, configured to obtain a deduction amount paid by the server based on the offline code information and the payment amount.

According to a fourth aspect, an implementation of the present specification further provides a server, including: an information receiving unit, configured to receive offline code information and a payment amount sent from a collection terminal, the offline code information being obtained by scanning, when the collection terminal is in an offline state, an offline code generated by a user terminal in an offline state; and a deduction unit, configured to pay a deduction amount from a corresponding payment account based on the offline code information and the payment amount, and put the deduction amount into a payment account corresponding to the collection terminal.

According to a fifth aspect, an implementation of the present specification further provides a system for processing payment in an offline scenario, including: a user terminal, configured to generate an offline code in an offline state; a collection terminal, configured to: when in an offline state, scan the offline code to obtain offline code information, obtain a payment amount, and save the offline code information and the payment amount, and after the offline code information and the payment amount are saved, if in an online state, upload the offline code information and the payment amount to a server; and the server, configured to receive the offline code information and the payment amount, pay a deduction amount from a corresponding payment account based on the offline code information and the payment amount, and put the deduction amount into a payment account corresponding to the collection terminal.

According to a sixth aspect, an implementation of the present specification further provides a server, including a memory, a processor, and a computer program stored in the memory and executable on the processor, where the processor implements the steps of the above method for processing payment in an offline scenario when executing the program.

According to a seventh aspect, an implementation of the present specification further provides a computer-readable storage medium storing a computer program, where when the program is executed by a processor, the steps of the above method for processing payment in an offline scenario are performed.

The implementations of the present specification have the following beneficial effects:

Based on the above technical solution, when in an offline state, the collection terminal scans an offline code generated by a user terminal to obtain offline code information; obtains a payment amount, and saves the offline code information and the payment amount; and when in an online state, uploads the offline code information and the payment amount, so that after receiving the offline code information and the payment amount, the server pays a deduction amount from a corresponding payment account based on the offline code information and the payment amount, and puts the deduction amount into a payment account corresponding to the collection terminal. As such, the payment function can still be achieved when the user terminal and the collection terminal are in an offline state.

DETAILED DESCRIPTION

For a better understanding of the above technical solutions, the technical solutions of implementations of the present specification will be described in detail below with reference to the accompanying drawings and specific implementations. It should be understood that the implementations of the present specification and specific features thereof are a detailed description of the technical solutions of the implementations of the present specification, rather than a limitation to the technical solutions of the present specification. The implementations of the present specification and technical features thereof can be combined with each other provided that no conflict occurs.

Figure 1:
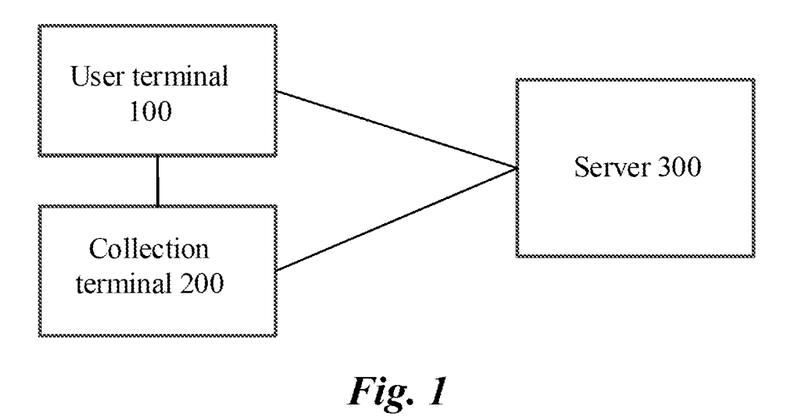
FIG. 1 is an architecture diagram illustrating a system for processing payment in an offline scenario according to an implementation of the present specification.

According to a first aspect, as shown in FIG. 1, an implementation of the present specification provides a system for processing payment in an offline scenario, including: a user terminal 100, configured to generate an offline code in an offline state; a collection terminal 200, configured to: when in an offline state, scan the offline code to obtain offline code information; obtain a payment amount, and save the offline code information and the payment amount; and after the offline code information and the payment amount are saved, if in an online state, upload the offline code information and the payment amount to a server 300; and the server 300, configured to receive the offline code information and the payment amount, pay a deduction amount from a corresponding payment account based on the offline code information and the payment amount, and put the deduction amount into a payment account corresponding to the collection terminal.

In this implementation of the present specification, that the server 300 is configured to pay a deduction amount from a corresponding payment account based on the offline code information and the payment amount specifically includes: the server 300 is configured to: when it is monitored that the user terminal 100 is in an online state, obtain a first payment account corresponding to the user terminal 100 based on the offline code information, and detect whether a deduction channel is available in the first payment account to pay the deduction amount; if it is detected that a deduction channel is available in the first payment account to pay the deduction amount, control the deduction channel in the first payment account to pay the deduction amount; and if it is detected that no deduction channel is available in the first payment account to pay the deduction amount, use a second payment account corresponding to the server 300 to pay the deduction amount; after the second payment account corresponding to the server 300 is used to pay the deduction amount, control the authority for payment of the first payment account to hold it in a restricted state, and write an arrears record in the first payment account, the arrears record including an arrears amount generated based on the payment amount.

In this implementation of the present specification, the arrears amount is the same as the payment amount. For example, if the payment amount is 500 dollars, the arrears amount is also 500 dollars.

In this implementation of the present specification, the user terminal 100 can be a mobile device such as a smartphone, a smartwatch or a tablet computer. Further, the collection terminal 200 can be an electronic device such as a smartphone, a smartwatch, a tablet computer, a desktop computer, a notebook computer or a collection device. Further, the server 300 can be an electronic device such as a tablet computer, a desktop computer or a notebook computer.

In this implementation of the present specification, the server 300 can activate, based on a user credit corresponding to the user terminal 100, an enjoy-now and pay-later agreement for a user corresponding to the user terminal 100, and after the user corresponding to the user terminal 100 activates the enjoy-now and pay-later agreement, the user terminal 100 can generate an offline code in an offline state. Certainly, the user corresponding to the user terminal 100 may not activate the enjoy-now and pay-later agreement. In this case, the user terminal 100 can still generate an offline code in an offline state.

In this implementation of the present specification, the user terminal 100 is configured to obtain a payment operation in an offline state, and generate the offline code in response to the payment operation.

Specifically, the user terminal 100 usually obtains, in an offline state, a payment operation based on a payment function of a certain application, and then generates the offline code in response to the payment operation. For example, after opening a certain application in an offline state, the user terminal 100 obtains a click operation (namely, the payment operation) based on a payment button in the application, and generates the offline code in response to the payment operation.

In this implementation of the present specification, the offline code is a quick response code generated in an offline state, and the offline code includes account information of the first payment account. Certainly, the offline code can further include information about the user terminal 100. For example, the offline code can include account information of the first payment account and a MAC address of the user terminal 100. Accordingly, the offline code information necessarily includes the account number information of the first payment account.

In this implementation of the present specification, the collection terminal 200 is configured to scan the offline code by using a scanning device in the collection terminal 200 or an external scanning device to obtain the offline code information, and determine the to-be-paid payment amount before scanning the offline code. As such, the payment amount can be obtained.

In this implementation of the present specification, the collection terminal 200 is configured to: when the offline code information and the payment amount are saved, assemble the offline code information and the payment amount into collection information, and then save the collection information. Because the offline code corresponds to the payment amount, after the offline code information and the payment amount are assembled into the collection information, the offline code information and the payment amount are bound to prevent the situation that the offline code information does not correspond to the payment amount.

In this implementation of the present specification, after saving the collection information, the collection terminal 200 uploads the collection information to the server 300 when detecting that the collection terminal 200 is in an online state. Because the collection information includes the offline code information and the payment amount, the collection terminal 200 uploads the offline code information and the payment amount to the server 300.

In this implementation of the present specification, before saving the offline code information and the payment amount, the collection terminal 200 can encrypt the offline code information and the payment amount. Certainly, the collection terminal 200 can further encrypt the collection information and then save the collection information, so as to reduce the probability that the offline code information and the payment amount are tampered with in the saving process and improve the security performance.

Specifically, the collection terminal 200 is configured to encrypt the offline code information and the payment amount with a private key, or to encrypt the collection information with the private key. In this case, the server 300 stores a public key corresponding to the private key.

Specifically, after encrypting and saving the offline code information and the payment amount, the collection terminal 200 uploads the encrypted offline code information and payment amount to the server 300, and enables the server 300 to decrypt the encrypted offline code information and payment amount based on the public key corresponding to the private key, so as to obtain the offline code information and the payment amount. Similarly, after the collection terminal 200 uploads the encrypted repayment information to the server 300, the server 300 is enabled to decrypt the encrypted repayment information based on the public key corresponding to the private key, so as to obtain the offline code information and the payment amount included in the repayment information.

In this implementation of the present specification, the offline state refers to a state when a device is not connected to the network, and the online state refers to a state when a device is connected to the network.

In this implementation of the present specification, the server 300 is configured to: after the offline code information and the payment amount are obtained, use the offline code information to monitor in real time whether the user terminal 100 is in an online state; and when it is monitored that the user terminal 100 is in an online state, obtain a first payment account corresponding to the user terminal 100 based on the offline code information, and detect whether a deduction channel is available in the first payment account to pay the deduction amount.

Specifically, the user terminal 100 registers the first payment account in the server 300 in advance, so that the server 300 stores the first payment account and an identifier of the user terminal 100. As such, when the server 300 is configured to use the offline code information to monitor in real time whether the user terminal 100 is in an online state, the first payment account is obtained based on the offline code information; then the identifier of the user terminal 100 corresponding to the first payment account is identified from the server 300 by using the first payment account; and whether the user terminal 100 is in an online state is monitored in real time by using the identifier of the user terminal 100, and when it is monitored that the user terminal 100 is in an online state, it is detected whether a deduction channel is available in the first payment account to pay the deduction amount.

In this implementation of the present specification, the server 300 stores payment accounts registered by a plurality of user terminals and identifiers of their corresponding user terminals, as shown in Table 1.

TABLE 1

| Payment account | Identifier of a user terminal |
|---|---|
| A1 | 45XX |
| A2 | XX36 |
| A3 | X2X5 |
| A4 | 3X7X |
| A5 | 98XX |

In this implementation of the present specification, the server 300 is configured to: in the process of detecting whether a deduction channel is available in the first payment account to pay the deduction amount, if it is detected that a deduction channel is available in the first payment account to pay the deduction amount, control the deduction channel in the first payment account to pay the deduction amount; and if it is detected that no deduction channel is available in the first payment account to pay the deduction amount, use a second payment account corresponding to the server 300 to pay the deduction amount, control the authority for payment of the first payment account to hold it in a restricted state, and write an arrears record in the first payment account.

In this implementation of the present specification, when detecting whether a deduction channel is available in the first payment account to pay the deduction amount, the server 300 can obtain a deduction sequence of deduction channels in the first payment account, and sequentially detect, based on the deduction sequence, whether the corresponding deduction channels can pay the deduction amount; if it is detected for the first time that a certain deduction channel can pay the deduction amount, pay the deduction amount by using the deduction channel; if it is detected that all deduction channel in the first payment account cannot pay the deduction amount, namely, it is detected that no deduction channel is available in the first payment account to pay the deduction amount, use a second payment account corresponding to the server 300 to pay the deduction amount, control the authority for payment of the first payment account to hold it in a restricted state, and write an arrears record in the first payment account.

In this implementation of the present specification, the server 300 is configured to put the deduction amount into a payment account corresponding to the collection terminal 200 after using the second payment account corresponding to the server 300 to pay the deduction amount, and can further generate collection success information, and send the collection success information to the collection terminal 200; and the server 300 is configured to put the deduction amount into a payment account corresponding to the collection terminal 200 after controlling the deduction channel in the first payment account to pay the deduction amount, and can further generate collection success information, and send the collection success information to the collection terminal 200.

In this implementation of the present specification, when the server 300 puts the deduction amount into the payment account corresponding to the collection terminal 200, the collection terminal 200 includes an identifier of the collection terminal 200 when uploading the offline code and the payment amount, and the server 300 identifies the payment account corresponding to the collection terminal 200 based on the identifier of the collection terminal 200, so as to put the paid deduction amount into the payment account corresponding to the collection terminal 200.

For example, the first payment account includes four deduction channels b1, b2, b3, and b4, and whether b1, b2, b3, and b4 can pay the deduction amount is detected in sequence. Whether b1 can pay the deduction amount is first detected, and if b1 cannot pay the deduction amount, whether b2 can pay the deduction amount continues to be detected; if b1 can pay the deduction amount, it is first detected that b1 is the deduction channel that can pay the deduction amount, and then b1 is used to pay the deduction amount; and the above operation is sequentially performed on b2, b3, and b4. As such, it can be detected whether a deduction channel is available in the first payment account to pay the deduction amount.

Certainly, when the server 300 detects whether a deduction channel is available in the first payment account to pay the deduction amount, if a plurality of deduction channels are present in the first payment account, it can also be randomly detected whether a deduction channel is available in the first payment account to pay the deduction amount. For example, when the first payment account includes four deduction channels b1, b2, b3, and b4, random detection is performed.

For example, after receiving the offline code information and the payment amount, the server 300 reads a payment account of the user terminal 100 from the offline code information as A3; then the server 300 identifies from Table 1 that an identifier of the user terminal corresponding to A3 is X2X5, determines by using X2X5 that the corresponding user terminal is the user terminal 100, monitors in real time, based on X2X5, whether the user terminal 100 is in an online state, and when monitoring that the user terminal 100 is an online state, detects whether a deduction channel is available in A3 to pay the deduction amount.

If the deduction order of the deduction channels in A3 is b1, b2, b3, and b4, it is sequentially detected whether b1, b2, b3, and b4 can pay the deduction amount; if it is detected that b1 and b2 cannot pay the deduction amount while b3 can pay the deduction amount, then it is detected that b3 is the first deduction channel that can pay the deduction amount, and then b3 is used to pay the deduction amount; if it is detected that b1, b2, b3, and b4 cannot pay the deduction amount, the second payment account corresponding to the server 300 is used to pay the deduction amount, the deduction amount is put into the payment account of the collection terminal 200, the authority for payment of A3 is controlled to be held in a restricted state, and the arrears record is written in A3.

As such, when the user terminal is in an offline state, its corresponding users can also enjoy a plurality of services, such as a riding service, a shopping service and a bike-sharing riding service, which better facilitates use.

In another implementation of the present specification, the server 300 is configured to further generate a fund recovery task after the arrears record is written in the first payment account.

In another implementation of the present specification, the server 300 is configured to: after the arrears record is written in the first payment account, when it is monitored that the user terminal 100 is in an online state, generate repayment guidance information, and send the repayment guidance information to the user terminal 100, so as to display the repayment guidance information on the user terminal 100.

In this implementation of the present specification, the repayment guidance information is guidance information for repayment operations, for example, it can be guidance information for repayment operations such as binding bank cards, recharging, and transfer.

In another implementation of the present specification, the server 300 is configured to: after the repayment guidance information is sent to the user terminal 100, monitor in real time whether the user terminal 100 performs a repayment operation; and after it is monitored that the user terminal 100 performs the repayment operation, trigger the fund recovery task, control the payment channel corresponding to the repayment operation to pay the deduction amount, and put the deduction amount into a payment account corresponding to the collection terminal 200. In this case, collection success information can be generated, and is sent to the collection terminal 200; and certainly, deduction success information can also be generated, and is sent to the user terminal 100.

In this implementation of the present specification, the restricted state refers to a state in which the payment account cannot make payment, and the unrestricted state refers to a state in which the payment account can make payment.

Specifically, when the server 300 is configured to monitor in real time whether the user terminal 100 has performed repayment operations, the user terminal 100 can perform repayment operations such as bank card binding, recharge and transfer. In this case, the server 300 can monitor the repayment information corresponding to the repayment operations, such as bank card binding, recharge and transfer that have been performed by the user terminal 100, so as to monitor, by monitoring the repayment information, whether the user terminal 100 has performed repayment operations.

As such, the collection terminal 200, when in an offline state, scans the offline code generated by the user terminal 100 to obtain offline code information, obtains a payment amount, and saves the offline code information and the payment amount, and when in an online state, uploads the offline code information and the payment amount, so that after receiving the offline code and the payment amount, the server 300 puts the deduction amount into a payment account corresponding to the collection terminal 200. As such, the payment function can still be achieved when the user terminal 100 and the collection terminal 200 are in an offline state.

Figure 2:
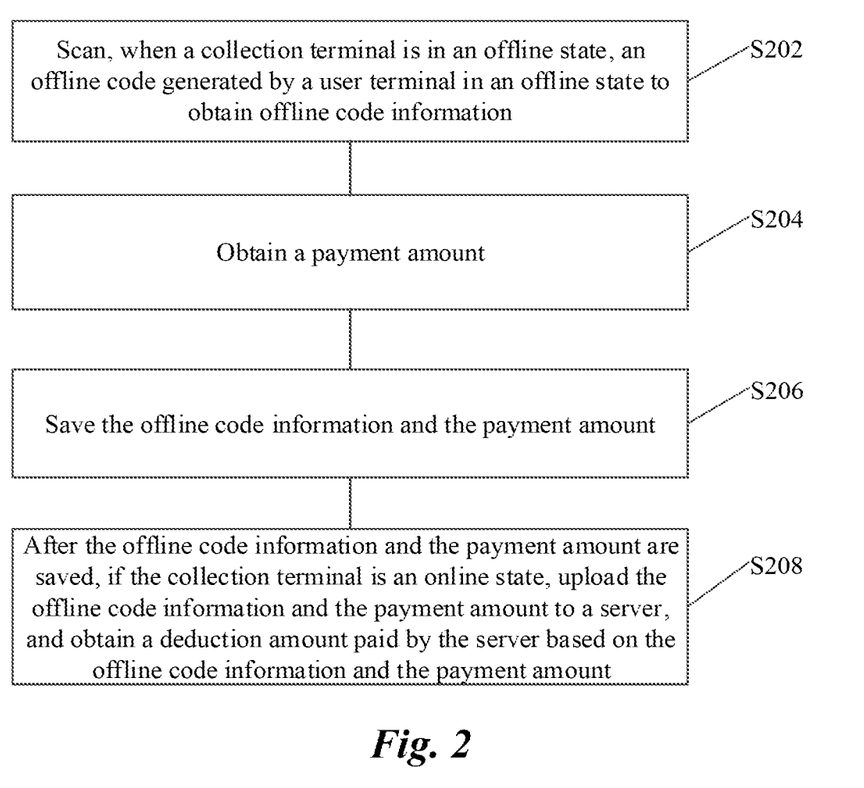
FIG. 2 is a first method flowchart illustrating a method for processing payment in an offline scenario according to an implementation of the present specification.

According to a second aspect, based on the same technical concept, an implementation of the present specification provides a method for processing payment in an offline scenario, which is applied to a collection terminal. As shown in FIG. 2, the method includes the following steps.

S202: Scan, when the collection terminal is in an offline state, an offline code generated by a user terminal in an offline state to obtain offline code information.

S204: Obtain a payment amount.

S206: Save the offline code information and the payment amount.

S208: After the offline code information and the payment amount are saved, if the collection terminal is in an online state, upload the offline code information and the payment amount to a server, and obtain a deduction amount paid by the server based on the offline code information and the payment amount.

In this implementation of the present specification, the server is configured to receive the offline code information and the payment amount; when it is monitored that the user terminal is in an online state, obtain a first payment account corresponding to the user terminal based on the offline code information, and detect whether a deduction channel is available in the first payment account to pay the deduction amount; if it is detected that a deduction channel is available in the first payment account to pay the deduction amount, control the deduction channel in the first payment account to pay the deduction amount, put the deduction amount into a payment account corresponding to the collection terminal, and then obtain a deduction amount paid by the server based on the offline code information and the payment amount; if it is detected that no deduction channel is available in the first payment account to pay the deduction amount, use a second payment account corresponding to the server to pay the deduction amount, put the deduction amount into a payment account corresponding to the collection terminal, and then obtain a deduction amount paid by the server based on the offline code information and the payment amount. As such, the payment amount is the same as the deduction amount.

In an optional implementation, the saving the offline code information and the payment amount specifically includes: assembling the offline code information and the payment amount into collection information, and saving the collection information.

In an optional implementation, the uploading the offline code information and the payment amount to the server specifically includes: uploading the collection information to the server.

Figure 3:
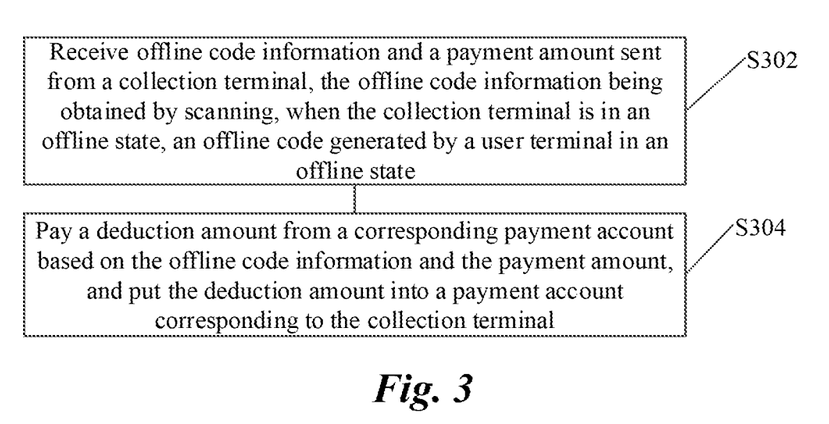
FIG. 3 is a second method flowchart illustrating a method for processing payment in an offline scenario according to an implementation of the present specification.

According to a third aspect, based on the same technical concept, an implementation of the present specification provides a method for processing payment in an offline scenario, which is applied to a server. As shown in FIG. 3, the method includes the following steps.

S302: Receive offline code information and a payment amount sent from a collection terminal, the offline code information being obtained by scanning, when the collection terminal is in an offline state, an offline code generated by a user terminal in an offline state.

S304: Pay a deduction amount from a corresponding payment account based on the offline code information and the payment amount, and put the deduction amount into a payment account corresponding to the collection terminal.

In an optional implementation, the paying a deduction amount from a corresponding payment account based on the offline code information and the payment amount specifically includes: when it is monitored that the user terminal is in an online state, obtaining a first payment account corresponding to the user terminal based on the offline code information, and detecting whether a deduction channel is available in the first payment account to pay the deduction amount; and if it is detected that a deduction channel is available in the first payment account to pay the deduction amount, controlling the deduction channel in the first payment account to pay the deduction amount; and if it is detected that no deduction channel is available in the first payment account to pay the deduction amount, using a second payment account corresponding to the server to pay the deduction amount.

In an optional implementation, the method further includes: after the using the second payment account corresponding to the server to pay the deduction amount, controlling the authority for payment of the first payment account to hold it in a restricted state, and writing an arrears record in the first payment account, the arrears record including an arrears amount generated based on the payment amount.

In an optional implementation, the detecting whether a deduction channel is available in the first payment account to pay the deduction amount specifically includes: obtaining a deduction sequence of deduction channels in the first payment account, and sequentially detecting, based on the deduction sequence, whether the corresponding deduction channels can pay the deduction amount.

In an optional implementation, the method further includes: after the writing the arrears record in the first payment account, generating a fund recovery task.

In an optional implementation, the method further includes: after the writing the arrears record in the first payment account, sending generated repayment guidance information to the user terminal when it is monitored that the user terminal is in an online state.

In an optional implementation, the method further includes: after the sending generated repayment guidance information to the user terminal, monitoring in real time whether the user terminal performs a repayment operation; and after it is monitored that the user terminal performs the repayment operation, triggering the fund recovery task, and controlling the payment channel corresponding to the repayment operation to pay the deduction amount.

Figure 4:
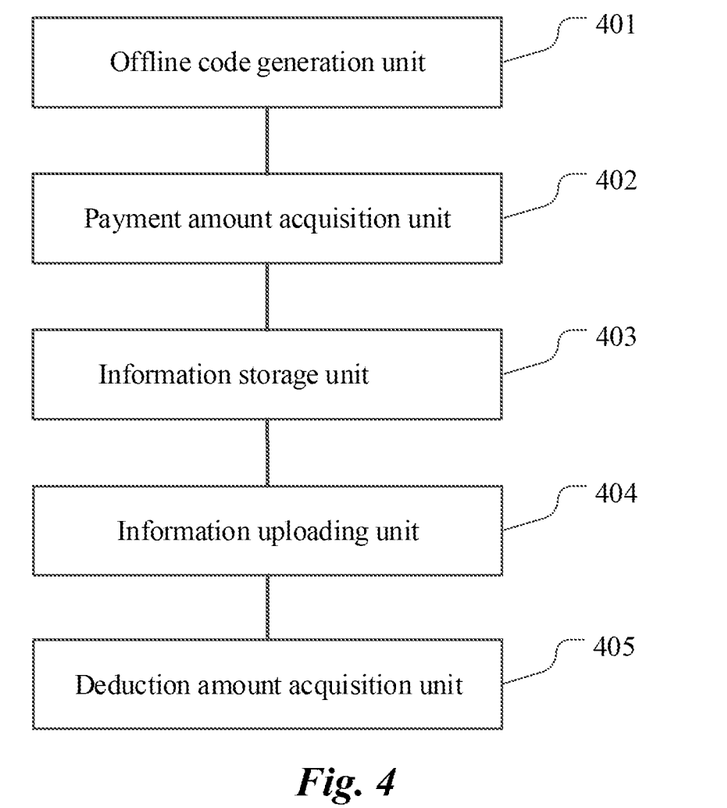
FIG. 4 is a schematic structural diagram illustrating a collection terminal according to an implementation of the present specification.

According to a fourth aspect, based on the same technical concept as the method according to the second aspect, an implementation of the present specification provides a collection terminal. As shown in FIG. 4, the collection terminal includes: an offline code generation unit 401, configured to scan, when the collection terminal is in an offline state, an offline code generated by a user terminal in an offline state to obtain offline code information; a payment amount acquisition unit 402, configured to obtain a payment amount; an information storage unit 403, configured to save the offline code information and the payment amount; an information uploading unit 404, configured to: after the offline code information and the payment amount are saved, if the collection terminal is in an online state, upload the offline code information and the payment amount to a server; and a deduction amount acquisition unit 405, configured to obtain a deduction amount paid by the server based on the offline code information and the payment amount.

In an optional implementation, the information storage unit 403 is specifically configured to assemble the offline code information and the payment amount into collection information, and save the collection information.

In an optional implementation, the information uploading unit 404 is specifically configured to upload the collection information to the server.

Figure 5:
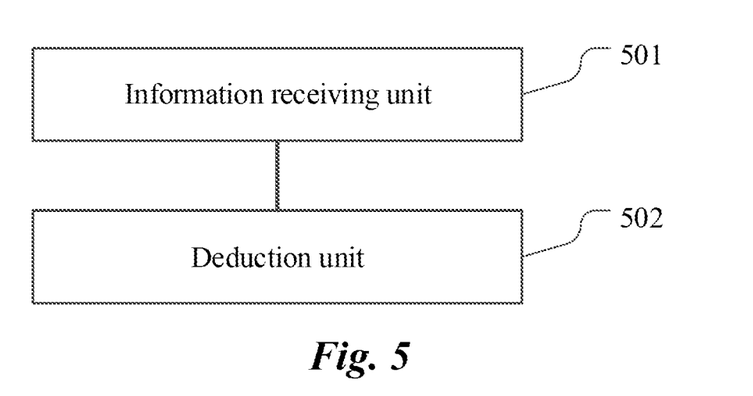
FIG. 5 is a schematic diagram illustrating a modular structure of a server according to an implementation of the present specification.

According to a fifth aspect, based on the same technical concept as the method according to the third aspect, an implementation of the present specification provides a server. As shown in FIG. 5, the server includes: an information receiving unit 501, configured to receive offline code information and a payment amount sent from a collection terminal, the offline code information being obtained by scanning, when the collection terminal is in an offline state, an offline code generated by a user terminal in an offline state; and a deduction unit 502, configured to pay a deduction amount from a corresponding payment account based on the offline code information and the payment amount, and put the deduction amount into a payment account corresponding to the collection terminal.

The deduction unit includes: a deduction detection subunit, configured to: when it is monitored that the user terminal is in an online state, obtain a first payment account corresponding to the user terminal based on the offline code information, and detect whether a deduction channel is available in the first payment account to pay the deduction amount; and a deduction subunit, configured to: if it is detected that a deduction channel is available in the first payment account to pay the deduction amount, control the deduction channel in the first payment account to pay the deduction amount; and if it is detected that no deduction channel is available in the first payment account to pay the deduction amount, use a second payment account corresponding to the server to pay the deduction amount.

In an optional implementation, the deduction detection subunit is specifically configured to obtain a deduction sequence of deduction channels in the first payment account, and sequentially detect, based on the deduction sequence, whether the corresponding deduction channels can pay the deduction amount.

In an optional implementation, the server further includes: an account control unit, configured to control the authority for payment of the first payment account to hold it in a restricted state after the second payment account corresponding to the server is used to pay the deduction amount; and a data writing unit, configured to write an arrears record in the first payment account, the arrears record including an arrears amount generated based on the payment amount.

In an optional implementation, the server further includes: a fund recovery task generation unit, configured to generate a fund recovery task after the arrears record is written in the first payment account.

In an optional implementation, the server further includes: a repayment guidance information sending unit, configured to: after the arrears record is written in the first payment account, send generated repayment guidance information to the user terminal when it is monitored that the user terminal is in an online state.

In an optional implementation, the server further includes: a repayment monitoring unit, configured to: after the generated repayment guidance information is sent to the user terminal, monitor in real time whether the user terminal performs a repayment operation; and a fund recovery unit, configured to: after it is monitored that the user terminal performs the repayment operation, trigger the fund recovery task, and control the payment channel corresponding to the repayment operation to pay the deduction amount.

Figure 6:
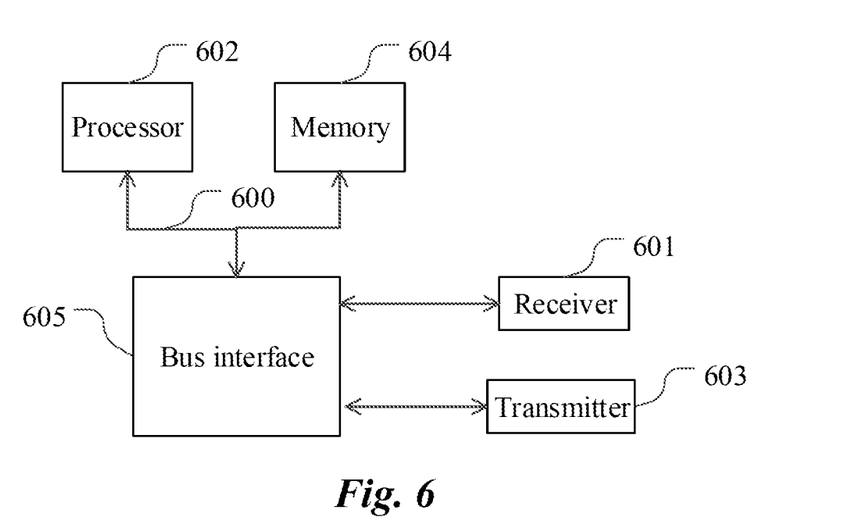
FIG. 6 is a schematic diagram illustrating a hardware structure of a server according to an implementation of the present specification.

According to a sixth aspect, based on the same inventive concepts as the method for processing payment in an offline scenario according to the above implementations, an implementation of the present specification further provides a server. As shown in FIG. 6, the server includes a memory 604, a processor 602, and a computer program stored in the memory 604 and executable on the processor 602, where the processor 602 implements the steps of any one of the above method for processing payment in an offline scenario when executing the program.

In FIG. 6, a bus architecture (represented by a bus 600) is provided. The bus 600 can include any number of interconnected buses and bridges. The bus 600 links various circuits including one or more processors represented by the processor 602 and memories represented by the memory 604 together. The bus 600 can also link various other circuits, such as peripheral components, voltage regulators and power management circuits, which are known in the art, and therefore will not be further described herein. A bus interface 605 provides an interface between the bus 600 and a receiver 601 and a transmitter 603. The receiver 601 and the transmitter 603 can be the same element, namely, a transceiver, which provides a unit for communication with various other apparatuses on a transmission medium. The processor 602 is responsible for management of the bus 600 and general processing, while the memory 604 can be configured to store data used by the processor 602.

According to a seventh aspect, based on the inventive concepts of the method for processing payment in an offline scenario according to the above implementations, an implementation of the present specification further provides a computer-readable storage medium storing a computer program, where when the program is executed by a processor, the steps of any one of the above methods for processing payment in an offline scenario are implemented.

The present specification is described with reference to flowcharts and/or block diagrams of methods, devices (systems), and computer program products according to the implementations of the present specification. It should be understood that each flow and/or block in the flowcharts and/or block diagrams, and combinations of flows and/or blocks in the flowcharts and/or block diagrams can be implemented by using computer program instructions. These computer program instructions can be provided to a processor of a general-purpose computer, a special-purpose computer, an embedded processor or another programmable data processing device to produce a machine, so that the instructions executed by the processor of the computer or another programmable data processing device produce a device for implementing functions specified in one or more flows in the flowchart and/or one or more blocks in the block diagram.

These computer program instructions can also be stored in a computer-readable memory that can direct a computer or another programmable data processing device to operate in a specific way, so that the instructions stored in the computer-readable memory produce an article of manufacture including an instruction device, and the instruction device implements functions specified in one or more flows of the flowchart and/or one or more blocks of the block diagram.

These computer program instructions can also be loaded onto a computer or another programmable data processing device, so that a series of operation steps are performed on the computer or another programmable device to perform computer-implemented processing, and thus the instructions executed on the computer or another programmable device provide steps for implementing functions specified in one or more flows of the flowchart and/or one or more blocks of the block diagram.

Although preferred implementations of the present specification have been described, a person skilled in the art can make additional changes and modifications to these implementations once he/she knows basic inventive concepts. Therefore, the appended claims are intended to be interpreted as including the preferred implementations and all changes and modifications falling within the scope of the present specification.

Obviously, a person skilled in the art can make various modifications and variations to the present specification without departing from the spirit and scope of the present specification. As such, if these modifications and variations of the present specification fall within the scope of the claims of the present specification and equivalent technologies thereof, the present specification is also intended to include these modifications and variations.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for processing electronic payment in an offline scenario, the method comprising:
at a server, receiving offline code information and a payment amount sent from a payment collection terminal, the offline code information being obtained by scanning, by the collection terminal that is in a first offline state, an offline code generated by a user terminal in a second offline state;
responsive to receiving the offline code information and the payment amount, at the server, initiating monitoring in real time whether the user terminal transitions to an online state;
responsive to detecting that the user terminal transitions to the online state, determining a deduction channel in a first payment account corresponding to the user terminal; and
providing a deduction amount for payment from a corresponding payment account based on the offline code information and the payment amount, and depositing the deduction amount into a payment account corresponding to the payment collection terminal.

2. The method according to claim 1, wherein the providing the deduction amount for payment from the corresponding account based on the offline code information and the payment amount includes:
detecting whether the deduction channel is available in the first payment account to pay the deduction amount; and
responsive to detecting that the deduction channel is available in the first payment account to pay the deduction amount, controlling the deduction channel in the first payment account to pay the deduction amount; and
responsive to detecting that no deduction channel is available in the first payment account to pay the deduction amount, using a second payment account corresponding to the server to pay the deduction amount.

3. The method according to claim 2, wherein the detecting whether the deduction channel is available in the first payment account to pay the deduction amount includes:
obtaining a deduction sequence of deduction channels in the first payment account, and sequentially detecting, based on the deduction sequence, whether the corresponding deduction channels are available to pay the deduction amount.

4. The method according to claim 3, further including: after the using the second payment account corresponding to the server to pay the deduction amount, controlling an authority for payment of the first payment account to hold the first payment account in a restricted state, and writing an arrears record in the first payment account, the arrears record including an arrears amount generated based on the payment amount.

5. The method according to claim 4, further including: after the writing the arrears record in the first payment account, generating a fund recovery task.

6. The method according to claim 4, further including: after the writing the arrears record in the first payment account, sending generated repayment guidance information to the user terminal responsive to detecting that the user terminal is in an online state.

7. The method according to claim 6, further including:
after the sending generated repayment guidance information to the user terminal, monitoring whether the user terminal performs a repayment operation; and
responsive to detecting that the user terminal performs the repayment operation, triggering the fund recovery task, and controlling the payment channel corresponding to the repayment operation to pay the deduction amount.

8. A server, comprising:
an information receiving unit, configured to receive offline code information and a payment amount sent from a collection terminal, the offline code information being obtained by scanning, by the collection terminal that is in an offline state, an offline code generated by a user terminal that is in an offline state;
a monitoring unit, configured to:
responsive to receiving the offline code information and the payment amount, initiate monitoring in real time whether the user terminal transitions to an online state; and
responsive to detecting that the user terminal transitions to the online state, determine a deduction channel in a first payment account corresponding to the user terminal; and
a deduction unit, configured to provide a deduction amount for payment from a corresponding payment account based on the offline code information and the payment amount, and deposit the deduction amount into a payment account corresponding to the collection terminal.

9. The server according to claim 8, wherein the deduction unit includes:
a deduction detection subunit, configured to detect whether the deduction channel is available in the first payment account to pay the deduction amount; and
a deduction subunit, configured to: if it is detected that a deduction channel is available in the first payment account to pay the deduction amount, control the deduction channel in the first payment account to pay the deduction amount; and if it is detected that no deduction channel is available in the first payment account to pay the deduction amount, use a second payment account corresponding to the server to pay the deduction amount.

10. The server according to claim 9, wherein the deduction detection subunit is further configured to obtain a deduction sequence of deduction channels in the first payment account, and sequentially detect, based on the deduction sequence, whether the corresponding deduction channels can pay the deduction amount.

11. The server according to claim 10, further including:
an account control unit, configured to control the authority for payment of the first payment account to hold the first payment account in a restricted state after the second payment account corresponding to the server is used to pay the deduction amount; and
a data writing unit, configured to write an arrears record in the first payment account, the arrears record including an arrears amount generated based on the payment amount.

12. The server according to claim 11, further including:
a fund recovery task generation unit, configured to generate a fund recovery task after the arrears record is written in the first payment account.

13. The server according to claim 11, further including:
a repayment guidance information sending unit, configured to: after the arrears record is written in the first payment account, send generated repayment guidance information to the user terminal responsive to detecting that the user terminal is in an online state.

14. The server according to claim 13, further including:
a repayment monitoring unit, configured to: after the generated repayment guidance information is sent to the user terminal, monitor in real time whether the user terminal performs a repayment operation; and
a fund recovery unit, configured to: responsive to detecting that the user terminal performs the repayment operation, trigger the fund recovery task, and control the payment channel corresponding to the repayment operation to pay the deduction amount.

* * * * *